United States Patent [19]

Hafner et al.

[11] Patent Number: 5,432,892
[45] Date of Patent: Jul. 11, 1995

[54] VOLUMMETRIC LINEAR INTERPOLATION

[75] Inventors: James L. Hafner; Wilfred E. Plouffe, Jr., both of San Jose, Calif.

[73] Assignee: International Business Machines Corporation, Armonk, N.Y.

[21] Appl. No.: 981,961

[22] Filed: Nov. 25, 1992

[51] Int. Cl.6 .............................................. G06T 5/00
[52] U.S. Cl. .................................. 395/131; 364/723; 364/731
[58] Field of Search ................ 395/123, 131; 364/723, 364/731

[56] References Cited

U.S. PATENT DOCUMENTS

| | | | |
|---|---|---|---|
| 4,075,663 | 2/1978 | Wellendorf | 358/283 |
| 4,275,413 | 6/1981 | Sakamoto et al. | 358/80 |
| 4,334,240 | 6/1982 | Franklin | 358/78 |
| 4,350,996 | 9/1982 | Rosenfeld | 358/75 |
| 4,456,924 | 6/1984 | Rosenfeld | 358/75 |
| 4,462,083 | 7/1984 | Schwefel | 364/577 |
| 4,463,374 | 7/1984 | Thompson | 358/78 |
| 4,464,677 | 8/1984 | Kuhn et al. | 358/75 |
| 4,468,693 | 8/1984 | Fujita et al. | 358/78 |
| 4,477,833 | 10/1984 | Clark et al. | 358/80 |
| 4,500,919 | 2/1985 | Schreiber | 358/78 |
| 4,511,989 | 4/1985 | Sakamoto | 364/723 |
| 4,561,016 | 12/1985 | Jung et al. | 358/76 |
| 4,639,770 | 1/1987 | Jung et al. | 358/76 |
| 4,670,780 | 6/1987 | McManus et al. | 358/80 |
| 4,717,954 | 1/1988 | Fujita et al. | 358/80 |
| 4,729,098 | 3/1988 | Cline et al. | 364/414 |
| 4,751,742 | 6/1988 | Meeker | 382/41 |
| 4,758,885 | 7/1988 | Sasaki et al. | 358/80 |
| 4,780,756 | 10/1988 | Shiota et al. | 358/78 |
| 4,805,013 | 2/1989 | Dei et al. | 358/80 |
| 4,829,587 | 5/1989 | Glazer et al. | 382/47 |
| 4,837,613 | 6/1989 | Paxton et al. | 358/75 |
| 4,837,722 | 6/1989 | Sara | 364/723 |
| 4,839,721 | 6/1989 | Abdulwahab et al. | 358/80 |
| 4,839,722 | 6/1989 | Barry et al. | 358/80 |
| 4,862,255 | 8/1989 | Takanaski et al. | 358/80 |
| 4,864,357 | 9/1989 | Matsunawa et al. | 355/32 |
| 4,876,509 | 10/1989 | Perlmutter | 324/309 |
| 4,879,594 | 11/1989 | Stansfield et al. | 358/80 |
| 4,893,181 | 1/1990 | Yeomans | 358/80 |

(List continued on next page.)

FOREIGN PATENT DOCUMENTS 2-206973  2/1990  Japan.
2-226869  2/1991  Japan.
9-89-513  3/1991  Japan.
1595122  8/1981  United Kingdom.

OTHER PUBLICATIONS

"A Novel Color Transformation Algorithm And It's Application" by Katsuhiro et. Image Processing Algorithm and Tech.; vol. 1244; 1990.

"Color Correction Technique for Hard Copies by 4-Neighbors Interpolation Method", Kanamori et al., Journal of Imaging Science and Technology, vol. 36, No. 1, Jan.-Feb. 1992, pp. 73-80.

"The Gamut of Real Surface Colours", M. R. Pointer, Research Division, Kodak Limited, Color Research Application, vol. 5, No. 3, Fall 1980, pp. 145-155.

Primary Examiner—Mark K. Zimmerman
Attorney, Agent, or Firm—Baker, Maxham, Jester & Meador

[57] ABSTRACT

A technique which efficiently approximates a continuous function employs volummetric linear interpolation and implements the interpolation process in an arithmetic apparatus which calculates a value $\vec{v}$ of the function according to:

$$\vec{v} = \vec{v_0} + \sum_{i=1}^{k} (u_i * (\vec{v_i} - \vec{v_0}))..$$

where $u_i$ are scaling factors corresponding to specifically known points $\vec{p_i}$ in a n-dimensional domain space of the function, $\vec{v_i}$ are specifically known points in an m-dimensional range space of the function and $k+1$ is the number of specifically known points.

32 Claims, 12 Drawing Sheets

U.S. PATENT DOCUMENTS

| | | | |
|---|---|---|---|
| 4,894,794 | 1/1990 | Shenk | 364/723 |
| 4,901,258 | 2/1990 | Akiyama | 364/577 |
| 4,941,038 | 7/1990 | Walowit | 358/80 |
| 4,941,039 | 7/1990 | E'Errico | 358/80 |
| 4,945,500 | 7/1990 | Deering | 364/522 |
| 4,959,711 | 9/1990 | Hung et al. | 358/80 |
| 4,972,329 | 11/1990 | Breger | 364/529 |
| 4,974,069 | 11/1990 | Shimomura | 358/75 |
| 4,992,861 | 2/1991 | D'Errico | 358/75 |
| 4,992,862 | 2/1991 | Gabor | 358/76 |
| 5,001,651 | 3/1991 | Rehme et al. | 364/518 |
| 5,025,404 | 6/1991 | Jannssen et al. | 364/723 |
| 5,025,405 | 6/1991 | Swanson | 364/723 |
| 5,054,097 | 10/1991 | Flinois et al. | 382/44 |
| 5,055,923 | 10/1991 | Kitagawa et al. | 358/75 |
| 5,072,305 | 12/1991 | Numakura et al. | 358/298 |
| 5,077,604 | 12/1991 | Kivolowitz et al. | 358/75 |
| 5,097,518 | 3/1992 | Scott et al. | 382/47 |
| 5,101,283 | 3/1992 | Seki et al. | 358/456 |
| 5,111,286 | 5/1992 | MacDonald et al. | 358/75 |
| 5,175,701 | 12/1992 | Newman et al. | 364/723 |
| 5,191,546 | 3/1993 | Green | 364/723 |

VOLUMMETRIC LINEAR INTERPOLATION

BACKGROUND OF THE INVENTION

1. Field of the Invention

This invention relates generally to evaluation of mathematical functions of many variables, and more specifically to a volummetric linear interpolation process for approximating the value of a continuous multivariable function.

2. Description of the Prior Art

Many modern-day processes require the evaluation of one or more mathematical functions. These functions frequently involve a multiplicity of variables interrelated by relatively complex mathematical expressions. Oftentimes, the overall efficiency of a process is determined by the relative ease or difficulty with which a function may be evaluated. For instance, in the field of color imaging, it is often desired to convert a color image from a first color space to a second color space. The first color space may be for an image representation stored in a computer file, and the second color space may be for specification of color created on paper by means of printer inks.

During the implementation of a process, it is generally more important to provide an efficient function evaluation technique, as opposed to providing a function evaluation technique optimized for maximum accuracy. For example, during the process of color image conversion, a quick, expedient evaluation of color image functions is much more important than a completely accurate representation of the converted color image. Efficiency is of paramount importance in this context because a common design goal of many image processing systems is to provide real-time processing capability. Accuracy is not a critical design parameter because the human eye can compensate for minor imaging errors. The characteristics of human visual perception generally allow for the existence of a known bounded error in image rendering. Although the importance of efficiency relative to accuracy has been described in conjunction with color imaging systems, a similar situation exists across a broad spectrum of other process applications as well.

In some process applications, the output of a function may be sampled, but the function itself is unknown. For example, consider the conversion of an image from the color space of a computer file to the surface of a newspaper. The actual colors produced by the printing ink interacting with the paper are difficult or impossible to accurately quantify. The factors resulting in the appearance of a given color on paper are represented by an unknown function, even though the value of the function can be sampled at various intervals. In this scenario, an accurate representation of the imaging information is not at all critical, and emphasis may instead be placed on data processing speed.

Many existing processes involve mathematical functions having extensive domains. It is generally impractical to sample the output of the function at all possible sample values. For example, FIG. 1 illustrates the domain of a mathematical function representing the color of an object in the context of a color image processing system. State of the art color imaging systems represent a color image as a regular array of spots, generally referred to as pixels. Each pixel is assigned a color represented by the coordinates of the color in a three dimensional space. In an additive color environment (i.e., a cathode-ray tube display), any color may be represented by a given combination of the three primary colors of red, green, and blue. With reference to FIG. 1, the value of red may be represented along the X axis 12, green along the Y axis 14, and blue along the Z axis 16. Each coordinate may be of arbitrary precision, but coordinates are generally represented using 8-bit values. In this manner, each pixel may be assigned one of $2^{24}$ different colors. Therefore, the domain of the mathematical function representing pixel color is quite extensive.

The mathematical function accepts input values within the domain of the function, and produces output values corresponding to the input values. The sequence of mathematical operations carried out by the function are determined by the process to be implemented. To print a color image displayed on a cathode-ray tube, the image must be converted from additive to subtractive form. As previously described, the cathode-ray tube image is stored as a pixel-by-pixel representation specifying particular quantities of the colors red, green, and blue. For subtractive color applications, such as printing, the three primary colors are magenta, yellow, and cyan (blue-green), with black used as an additional or optional color for increased density (darkness) or decreased total ink usage. Accordingly, a function must be determined for the purpose of converting pixel color representations into known quantities of colored printer inks, typically with the amount expressed as an integer in the range of 0 to 255 for each of cyan, yellow, magenta, and black. The function accepts input values for the variables red, green, and blue, and produces output values which represent quantities of magenta, yellow, cyan, and black. Other color spaces in use as either input or output spaces include the colormetric spaces which represent color based on the tristimulus values that represent a standard observer as defined by the Commission Internationale de l'Eclairage. CIE $L^*a^*b^*$, CIE $L^*u^*v^*$, and CIE XYZ are three such spaces.

For many processes, it is highly impractical to define a function in analytical form. In the context of color image conversion, it would be very difficult to develop a working analytical model for the purpose of converting a cathode-ray tube image representation into a form suitable for color printing on newspaper media. If the printer inks offered a perfectly linear response, and if the paper was perfectly white, then the function for the conversion of the color image could be specified analytically. However, as a practical matter, the inks have a nonlinear response, and the paper is off-white. Consequently, the print function is best represented by using measurements accumulated for a plurality of print samples. There are $2^{24}$ points in the function domain which could be sampled, so it would be prohibitively time-consuming and storage intensive to measure and store all of these values. Rather, the function may be approximated using a smaller set of measured values (sample points), and using interpolation to compute the approximate values for all of the other domain values.

One advantageous interpolation technique is known as volummetric linear interpolation. In the context of three-dimensional space, one of two techniques is usually employed to implement volummetric linear interpolation. The first technique is trilinear interpolation, and the second is tetrahedral interpolation. Tetrahedral interpolation is often selected in preference to other methods of approximating a function, such as trilinear interpolation, because tetrahedral interpolation requires fewer arithmetic operations to compute an approximation. The reduced number of steps required to execute tetrahedral interpolation has important practical consequences, in that less hardware is required, and the computational steps may be implemented faster and more efficiently.

Volummetric linear interpolation is implemented by selecting a plurality of sample points from the domain of a function. These points may be chosen at regularly-spaced intervals, as illustrated in FIG. 1. The domain of the mathematical function depicted in FIG. 1 is three-dimensional, with the result that the selected sample points form an array of geometrical volumes. Samples are taken at points 18, 20, 22, 24, 26, 28, 30, 32, 34, 36, 38, 40, 42, 44, 46, and 48. In this manner, the sample points form a rectangular grid throughout the domain of the function. The rectangular grid is comprised of a plurality of rectangular volumes 10.

In the case of tetrahedral interpolation, the domain of the function is divided into a plurality of tetrahedral volumes. The process of dividing the function domain in this manner is often a two-step procedure. Typically, the domain is first divided into rectangular solids as shown in FIG. 1, and then each of the rectangular solids so created is then subdivided into a plurality of tetrahedra.

FIG. 2 sets forth an illustrative example of subdividing a part of a function domain into tetrahedral volumes. A rectangular solid 10 is shown, corresponding to any one of the rectangular solids of FIG. 1. The rectangular solid 10 is subdivided into five tetrahedra 200, 202, 204, 206, and 208. Although the geometrical configuration of FIG. 2 illustrates the division of a rectangular volume into five tetrahedra, it is also possible to divide the rectangular volume into another number of tetrahedral structures. For example, the rectangular solids are often divided into six or twelve tetrahedra. One technique for subdividing the rectangular volume involves positioning six tetrahedra within the volume such that all six tetrahedra have a common base point at a corner of the rectangular solid. In this manner, all of the tetrahedra share a common edge along a diagonal of the rectangular volume. Methods, such as those described above, for dividing the domain of a function into geometrical volumes are well-known to those skilled in the art.

FIG. 3 is a perspective view illustrating the geometrical structure of a tetrahedron shown in FIG. 2. The tetrahedron 200 is a geometric solid having four planar faces 302, 304, 306, and 308, six edges a—a', b—b', c—c', d—d', e—e', and f—f, and four vertices 310, 312, 314, and 316.

To approximate the value $\vec{v}$ of the function at any arbitrarily selected point $\vec{p}$ along the function domain, the tetrahedron containing the selected point must be determined. The function values $\vec{v}$ at the four vertices 310, 312, 314, and 316 of the selected tetrahedron are sampled, and a standard three dimensional linear interpolation procedure is applied to the function values $\vec{v}$ to calculate an approximation for the function value $\vec{v}$ at the point $\vec{p}$. The numerical constants required to implement the linear interpolation procedure such as the vertex coordinates and the corresponding function values are typically stored in one or more interpolation tables. In this manner, it is not necessary to obtain sample values for the function value $\vec{v}$ at all points along the function domain.

For a function of n variables at $k+1 >= n+1$ points, the function having m components, the standard linear interpolation procedure requires the performance of $k+1$ multiplication steps and k addition steps for each of the m components of F. This totals $(k+1)m$ multiplication operations and km addition operations. The performance of each of these mathematical operations consumes valuable hardware resources, and increases the time required to calculate an approximation. Consequently, it would be very desirable to reduce the overall number of operations required to implement volummetric linear interpolation. Multiplication steps should be avoided wherever possible, as these steps are much more expensive to implement than additions. Accordingly, it would be especially desirable to reduce the number of multiplication operations required.

The interpolation tables employed by existing volummetric interpolation methods must be stored in a memory device such as Random-Access Memory (RAM). These tables often occupy large blocks of memory space. Therefore, it would be desirable to reduce the size of the required interpolation tables in order to conserve valuable memory space.

A method of computing a tetrahedral interpolation function is described in "Color Correction Technique for Hard Copies by 4-Neighbors Interpolation Method", *Journal of Imaging Science and Technology*, Vol. 36, No. 1, Jan–Feb 1992, by Katsuhiro Kanamori and Kiroaki Kotera. This method discloses $$\begin{bmatrix} C \\ M \\ Y \end{bmatrix} = [h] \begin{bmatrix} x \\ y \\ z \\ 1 \end{bmatrix} = \begin{bmatrix} H_{Cx} & H_{Cy} & H_{Cz} & 1 \\ H_{Cx} & H_{My} & H_{Mz} & 1 \\ H_{Yx} & H_{Yy} & H_{Yz} & 1 \end{bmatrix} \begin{bmatrix} x \\ y \\ z \\ 1 \end{bmatrix}$$

to compute an approximation for the function value [c, m, y] which corresponds to the colors cyan, magenta and yellow, respectively.

The above formula is only applicable in the case of a function having both a three-dimensional input and a three-dimensional output. Quite frequently, however, it is desired to convert a standard Red-Green-Blue (RGB) video image into a Cyan-Magenta-Yellow-Black (CMYK) printed image. Alternatively, it may be desired to process image information received from a plurality of electromagnetic sensors, wherein each sensor is responsive to a different range of frequencies in the electromagnetic spectrum. If the output of each sensor is conceptualized as representing a given dimension, such an imaging system may require the performance of calculations in a number of dimensions greater than three. What is needed is a function approximation method which is capable of being utilized in conjunction with multidimensional functions where the domain inputs, range outputs or both, represent three or more dimensions.

SUMMARY OF THE INVENTION

The invention provides an improved method for approximating the value $\vec{v}$ of an m-vector valued function F of n variables using $k+1 >= n+1$ points. The points are represented as a set of vectors $\vec{p}_0, \vec{p}_1, \ldots \vec{p}_k$. The function is of the form $\vec{v}_i = F(\vec{p}_i)$, where i is in the range of 0 to k. Such functions are often employed in the field of color image processing systems. The value $\vec{v}$ denotes the interpolated output value of the function at an arbitrarily selected point $\bar{p}$ situated within the domain of the function. $\bar{p}$ represents a target evaluation point serving as an input to the function F. $\bar{p}$ is conceptualized as a summation vector represented by the sum of one or more vectors $\bar{p}_i$, and $\bar{v}$ is conceptualized as a summation vector which includes the sum of one or more vectors $\bar{v}_i$.

The volummetric linear interpolation method of the present invention operates by defining volummetric linear interpolation scaling constants $u_i$. A set of scaling factors $u_i$ are utilized, such that $$\sum_{i=0}^{k} u_i = 1.$$

Each scaling factor $u_i$ corresponds to a specific point $P_i$ and a specific function value $v_i$. Respective $p_i$ are multiplied by corresponding $u_i$, such that the sum of all $(u_i)*(p_i)$ products is equal to a vector $\bar{p}$, where i is in the range of 0 to k. Respective $v_i$ are multiplied by corresponding $u_i$, such that the sum of all $(u_i)*(v_i)$ products is equal to a vector $\bar{v}$.

The equation for $u_0$, $$u_0 = 1 - \sum_{i=1}^{k} u_i,$$

is substituted into the equation for $\bar{v}$. In this manner, an equation for the value $\bar{v}$ of the function is obtained as $$\vec{v} = \vec{v_0} + \sum_{i=1}^{k} (u_i * (\vec{v_i} - \vec{v_0})).$$

This last equation is used to calculate an approximation for the function F. If F is a linear function, then the value $\bar{v}$ obtained by the procedure set forth above is exact.

An interpolation calculation using the aforementioned equations requires k additions for each of the m components of the function F to compute the term in parentheses after the summation sign, k multiplication operations followed by k-1 additions to complete the summation process, and one final addition operation. Taking the m components of the function F into consideration, a total of km multiplications and 2km additions are required to implement volummetric linear interpolation according to a first embodiment of the present invention. A second embodiment of the present invention stores the values $(\bar{v}_i-\bar{v}_0)$ to reduce the number of additions by km, yielding a total of km multiplications and km additions.

In contrast to prior art methods, the number of additions is the same for the second embodiment and more for the first, but the amount of required storage may be substantially less for many cases of interest.

For example, the Kanamori and Kotera method requires $12*2*5*2^{3b}$ bytes where 12 2-byte values, $\bar{v}_i$, are stored for each of 5 tetrahedra per rectangular solid and $2^{3b}$ rectangular solids are required to completely fill the function domain. Here, b is the number of bits $(0<b<8)$ of each of the n components of a point $\bar{p}$ used to determine the rectangular solid which includes $\bar{p}$.

In contrast, the first embodiment requires $2 * 2^{3*(b+1)}+2^{3*(8-b)}$ bytes where the first term represents only the storage of the values $\bar{v}_i$ and the second term represents the storage of the values $u_i$ for a single rectangular solid. This embodiment requires less storage than the Kanamori and Kotera method whenever $b>2$.

The second embodiment requires $4 * 2 * 5 * 2^{3b}+2^{3*(8-b)}$ bytes where the first term represents storing the 2-byte values $\bar{v}_i-\bar{v}_0$ for $1 \leq i \leq k$ and $\bar{v}_0$ for each of the 5 tetrahedra per rectangular solid and the second term represents the storage of the values $u_i$ for a single rectangular solid. This embodiment also requires less storage whenever $b>2$.

BRIEF DESCRIPTION OF THE DRAWINGS

The various features, aspects, and advantages of the present invention will become apparent from the following more particular description thereof, presented in conjunction with the following drawings, wherein.

DETAILED DESCRIPTION OF THE PREFERRED EMBODIMENTS

Figure 4:
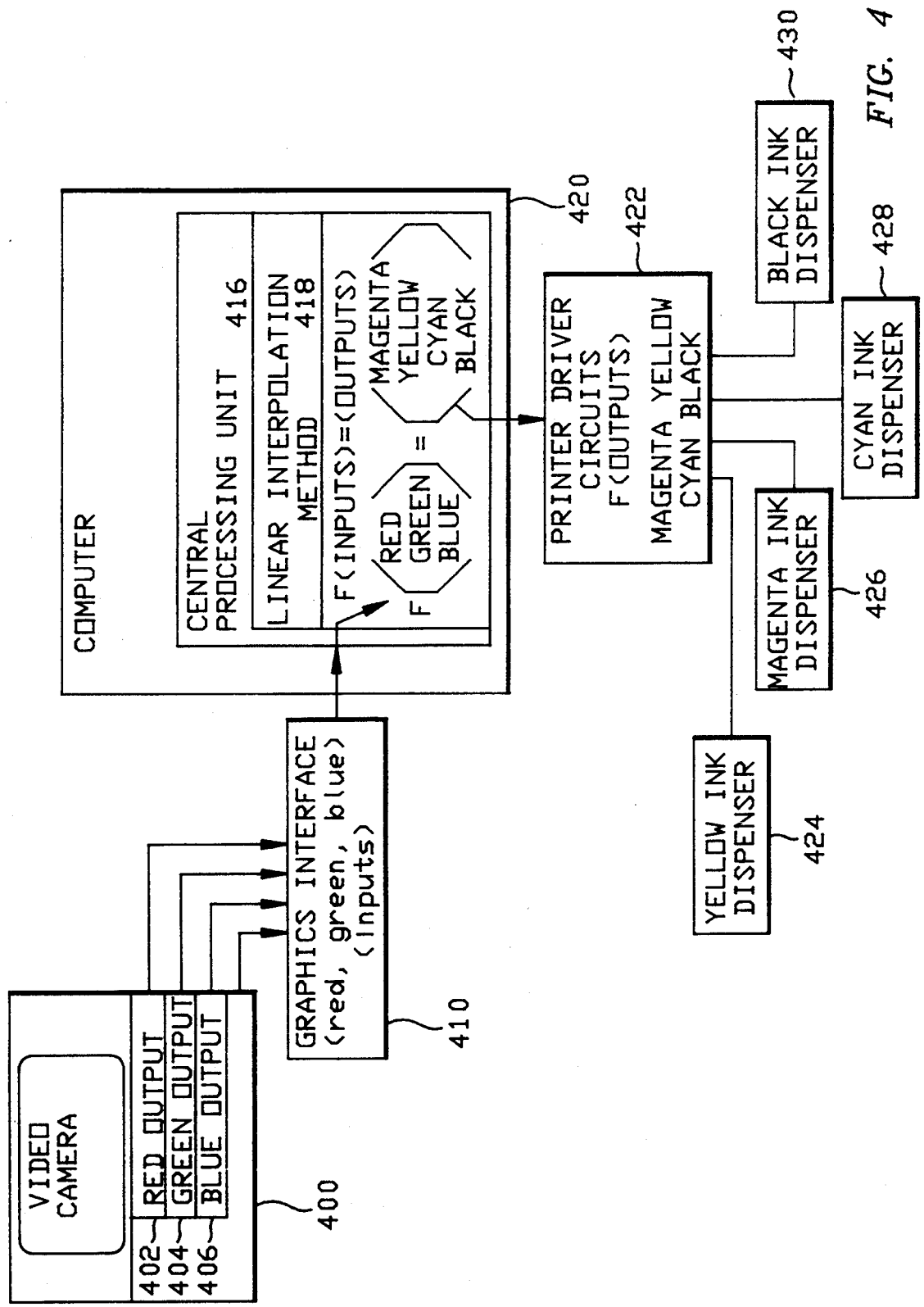
FIG. 4 is a block diagram illustrating the overall operational environment of a preferred embodiment of the present invention in the context of a color image processing system.

FIG. 4 is a block diagram illustrating the overall operational environment of a preferred embodiment of the present invention. The volummetric linear interpolation method 418 of the present invention is executed by a computer 420 which includes a central processing unit 416, and possibly other internal or external devices. Computer 420 may be, for example, a simple desktop personal computer, or a large, complex mainframe computer. The central processing unit 416 is equipped to execute the instructions necessary to implement the volummetric linear interpolation method of the invention.

The computer 420 is coupled to a graphics interface 410 which in the illustrated example interfaces with a video camera 400. The video camera 400 provides a red output 402, a green output 404, and a blue output 406. The outputs are connected to the graphics interface 410, which converts the outputs into a multivariable mathematical function having input variables of red, green and blue. The mathematical function is fed to the central processing unit 416, where the linear interpolation method 418 of the present invention is applied to the function. The output of the linear interpolation method 418 in the present example is a mathematical function having outputs representing quantities of cyan, magenta, yellow, and black. These outputs are fed to printer driver circuits 422. These circuits control the amount of ink dispensed by yellow, magenta, cyan and black ink dispensers 424, 426, 428, and 430 respectively.

FIG. 4 shows the invention as being employed in the context of a video camera 400 and ink dispensers 424, 426, 428, and 430 for illustrative purposes. For example, a photoluminescent video display screen could be used in place of the video camera 400. Furthermore, the invention may be employed in contexts other than color image processing, wherever it is desired to approximate the value of a multivariable function.

Figure 5:
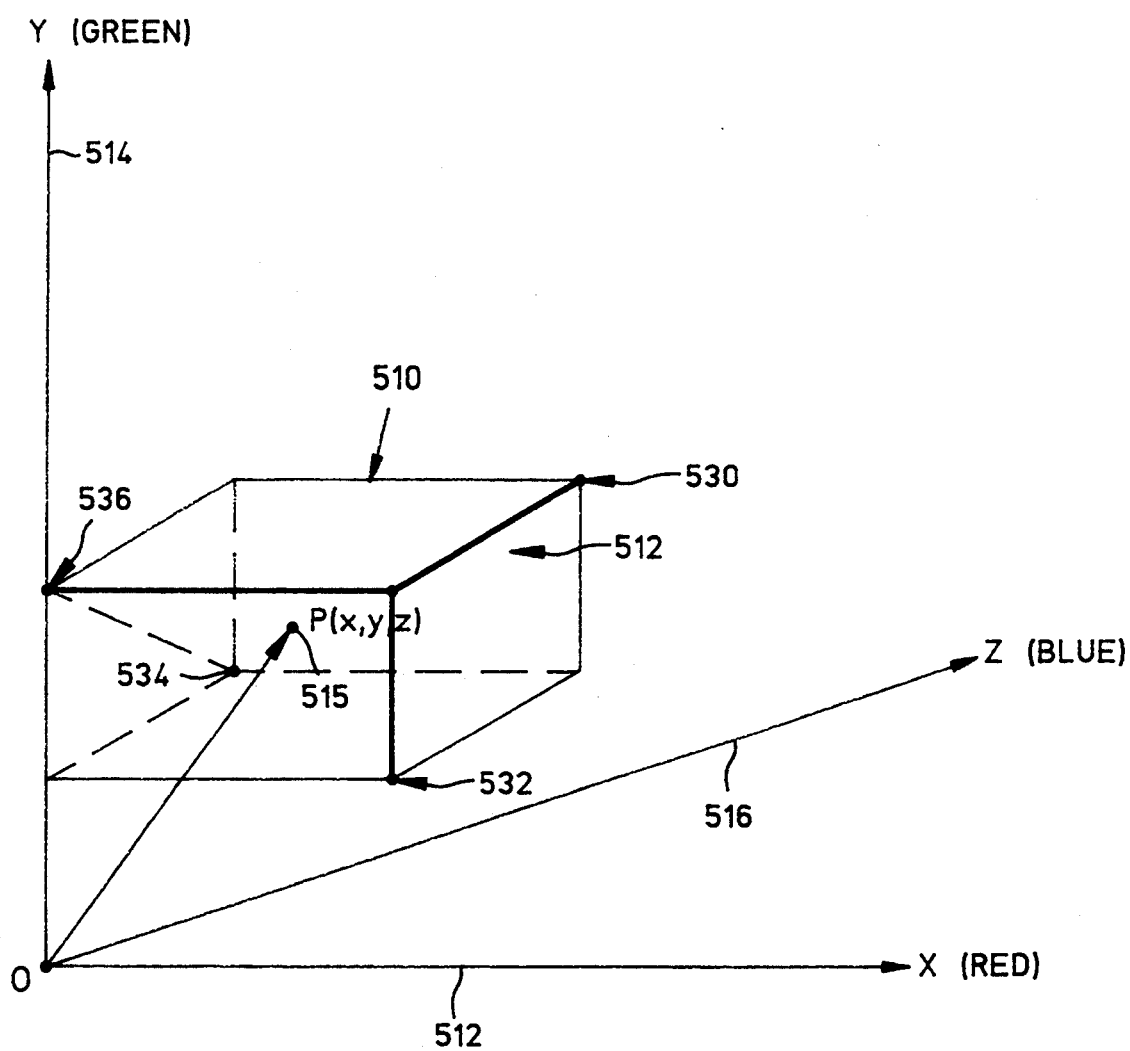
FIG. 5 is a three-dimensional graph illustrating an arbitrarily-selected point within the domain of the function shown in FIG. 1.

FIG. 5 is a three-dimensional graph illustrating a point p 515 which has been arbitrarily selected from the domain of a function F. The x axis 512 represents the magnitude of the color red, the y axis 514 represents the magnitude of the color green, and the z axis 516 represents the magnitude of the color blue. Allowable values for x, y, and z are in the range of 0 to 100, which defines the domain of the function. Although 8-bit values are frequently employed to represent color, the function domain is simplified in this example for purposes of illustration. The point p 515 represents the color of one picture element (pixel) within a given video image specified in additive primary color form.

In the present example, point p 515 represents a pixel of a color image received by a video camera. Assume that the video camera was aimed at the ocean, resulting in a point p 515 at a location of x=10, y=50, and z=80, corresponding to a color in the range of cyan to blue. It is desired to convert the video image into a form suitable for newspaper print. The additive primary color representation of the pixel must be converted into a form representing subtractive primary colors. The conversion process may be expressed as a mathematical function with input variables of red, green, and blue, and output values of cyan, magenta, yellow and black.

Figure 1:
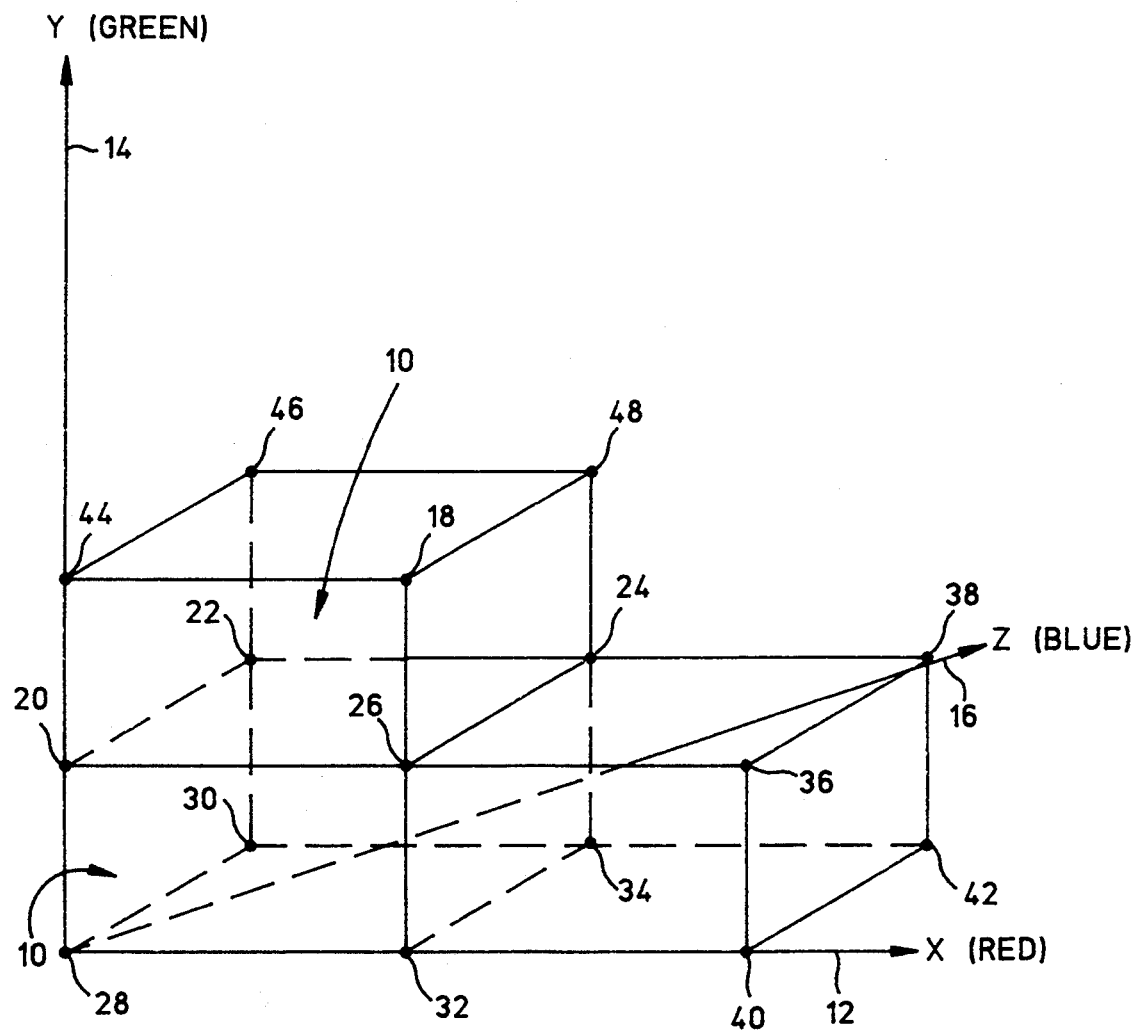
FIG. 1 is a perspective view illustrating the division of the domain of a multivariable mathematical function into rectangular volumes.
Figure 2:
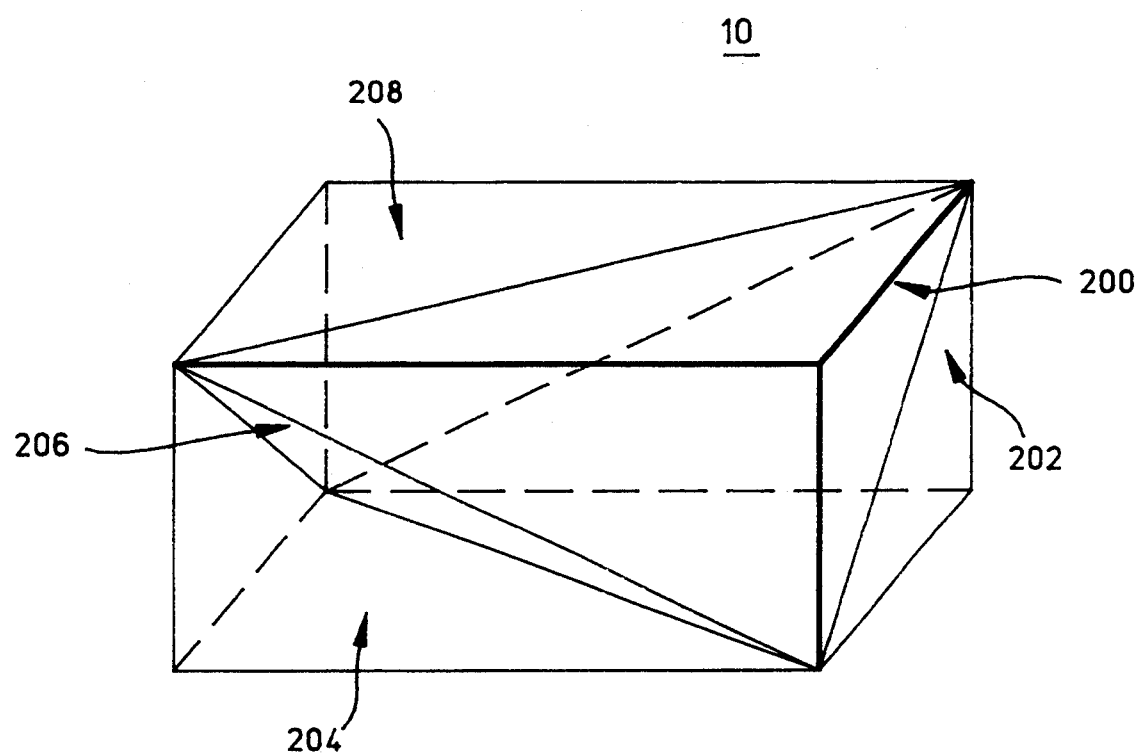
FIG. 2 is a perspective view illustrating the subdivision of a rectangular volume into a plurality of tetrahedral structures.
Figure 3:
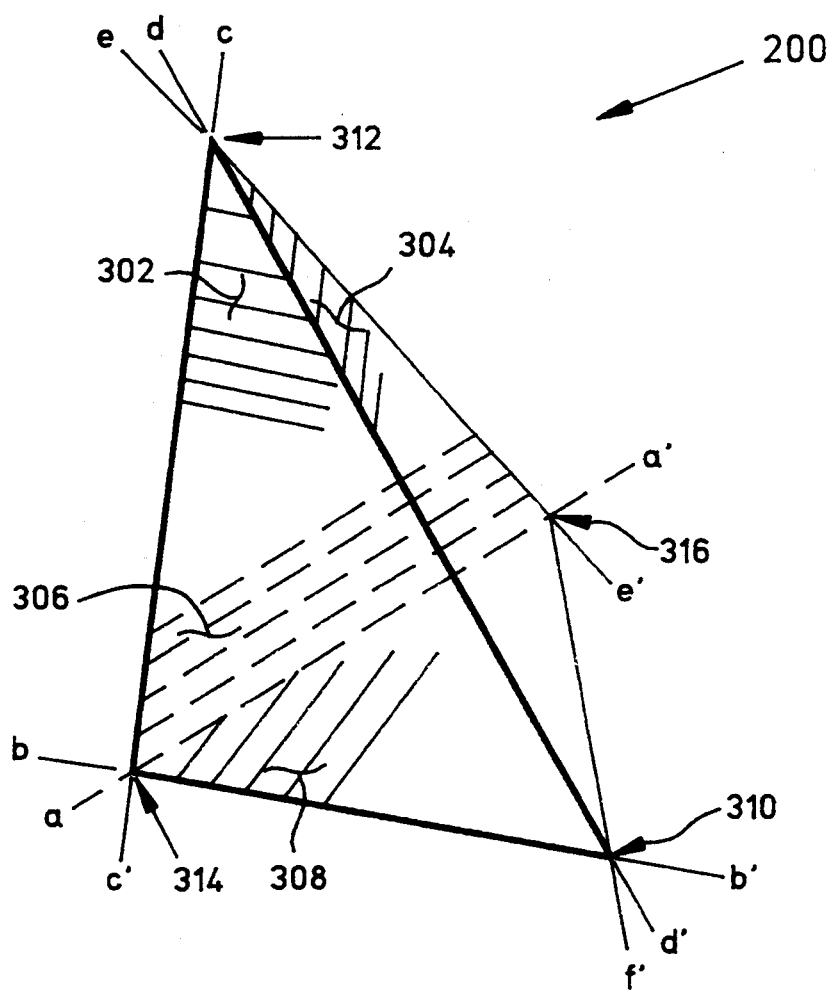
FIG. 3 is a perspective view illustrating the geometrical properties of a tetrahedron.

Since the mathematical function for color conversion is relatively complex, it does not readily lend itself to analytical specification. It would be much more efficient to sample the value of the function at representative points throughout the function domain, and to tabulate these values for future reference. Accordingly, the domain of the function is divided as indicated in FIGS. 1-3, and sample values for the function are taken at the vertices of each tetrahedron. Then, if it is desired to know the value of the function at an arbitrarily selected point p 515 within the function domain, the value of the function can be interpolated by referring to the known function values at the nearest sample points. This is accomplished by first locating the rectangular solid 510 containing the selected point p 515, then determining the tetrahedron 512 within the solid that contains point p. The sampled values of the function at the vertices 530, 532, 534, 536 of the selected tetrahedron are utilized in the interpolation process to calculate an approximate value for the function at the selected point p 515.

Point p 515 at the coordinates (10, 50, 80) lies within the tetrahedron having vertices 530, 532, 534, and 536.

The relationship between the additive and subtractive primary colors has been characterized at each of the tetrahedron vertices 530, 532, 534, 536. For example, assume that vertex 530 has coordinates of (12, 56, 84) representing respective quantities of red, green, and blue. During the function sampling process, it was determined that these quantities of red, green, and blue correspond to a cyan value of 78, a magenta value of 34, a yellow value of 6 and a black value of 10. Similar samples were taken at vertices 532, 534, and 536. The known relationship between function input (red, green, blue) and output (cyan, magenta, yellow and black) at these vertices 530, 532, 534, 536 is utilized by linear interpolation procedures to approximate the relationship between function input and output at points where the exact relationship between function input and output is not known. The relative ease or difficulty by which the function may be approximated oftentimes determines the overall efficiency of the color imaging process. Therefore, it is highly desirable to develop fast, effective methods of linear interpolation.

Figure 6:
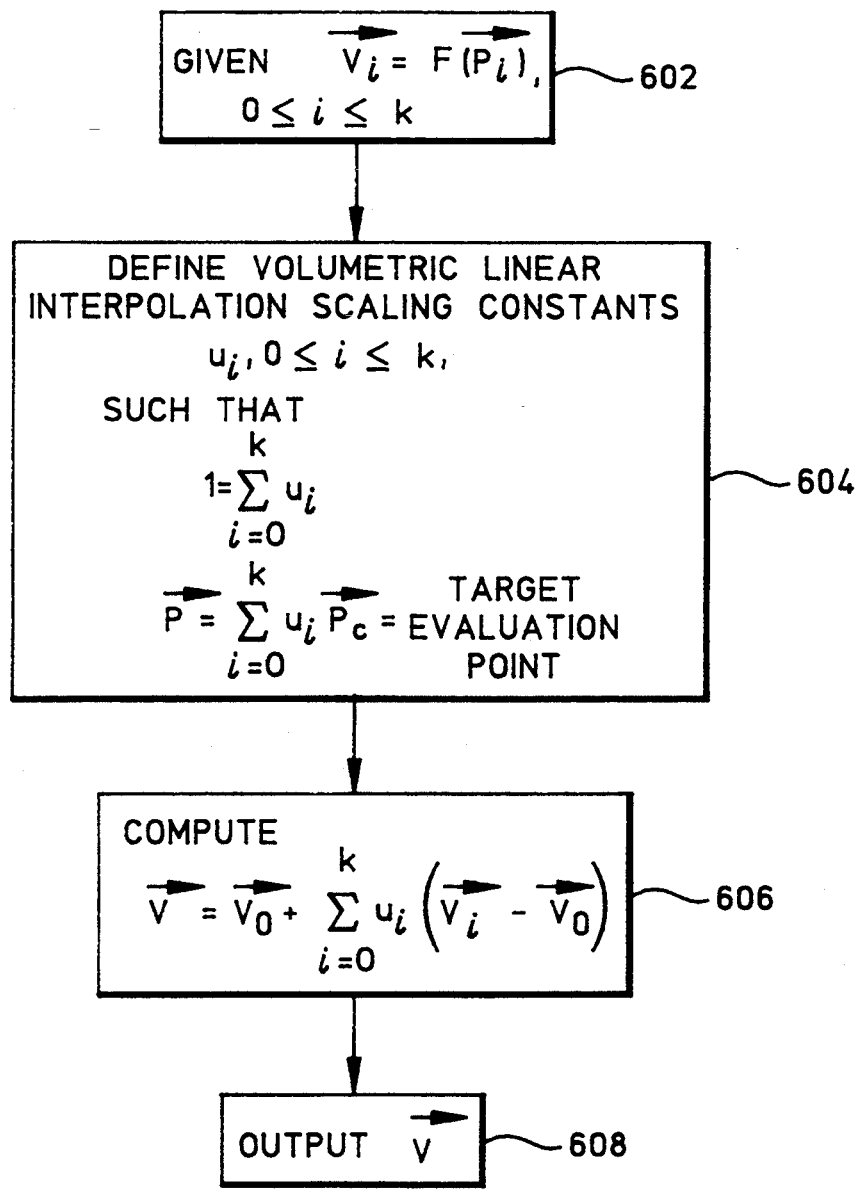
FIG. 6 is a flowchart setting forth a first embodiment of the volummetric linear interpolation method of the present invention.

The invention provides improved methods for approximating the value $\vec{v}$ of an m-vector valued function F of n variables at $k+1 >= n+1$ points. The steps required to implement function approximation according to a first embodiment of the invention are set forth in FIG. 6. At block 602, the function parameters are defined. The function is of the form $\vec{v}_i = F(\vec{p}_i)$, where i is in the range of 0 to k, and k+1 denotes the number of sample points used in the interpolation process. The function may be written in terms of n variables. The input points of the function are represented as a set of vectors $\vec{p}_0, \vec{p}_1, \ldots \vec{p}_k$. Such functions are often employed in the field of color image processing systems.

The output of the process is to be the value $\vec{v}$ which denotes the interpolated output value of the function at an arbitrarily selected point $\vec{p}$ situated within the domain of the function (block 604). For a particular target evaluation point $\vec{p}$, the set of k+1 vectors $\vec{p}_i$ are inputs to the interpolation process (block 602).

Program control progresses to block 604, where the volummetric linear interpolation scaling constants $u_i$ are determined. These volummetric linear interpolation scaling constants are calculated such that $$1 = \sum_{i=0}^{k} u_i \text{ and } \vec{p} = \sum_{i=0}^{k} \vec{p}_i * u_i.$$

Since it would be time-consuming and inefficient to calculate the scaling constants for each point $\vec{p}$ within a large image, this invention allows for the possible storing of the scaling constants and then the retrieval of the appropriates constants in block 604. Each scaling factor $u_i$ corresponds to a specific point $\vec{p}_i$ and a specific function value $\vec{v}_i = F(\vec{p}_i)$.

Next, at block 606, the value $\vec{v}$ of the function is approximated using the equation $$\vec{v} = \vec{v}_0 + \sum_{i=1}^{k} u_i * (\vec{v}_i - \vec{v}_0).$$

If F is a linear function, then the value $\vec{v}$ obtained by the procedure set forth above is exact.

An interpolation calculation using the aforementioned equations requires k additions for each of the m components of the function F to compute the term in parentheses, k multiplication operations followed by k-1 additions to complete the summation process, and one final addition operation. Taking the m components of the function F into consideration, a total of km multiplications and 2km additions are required to implement volummetric linear interpolation according to the method of the present invention. By contrast, prior art methods require k multiplication operations and k addition operations for each of the m components of the function.

This totals km multiplications and km additions for the prior art methods; however, they require more storage for constants than variant 1 of the present invention.

Figure 7A:
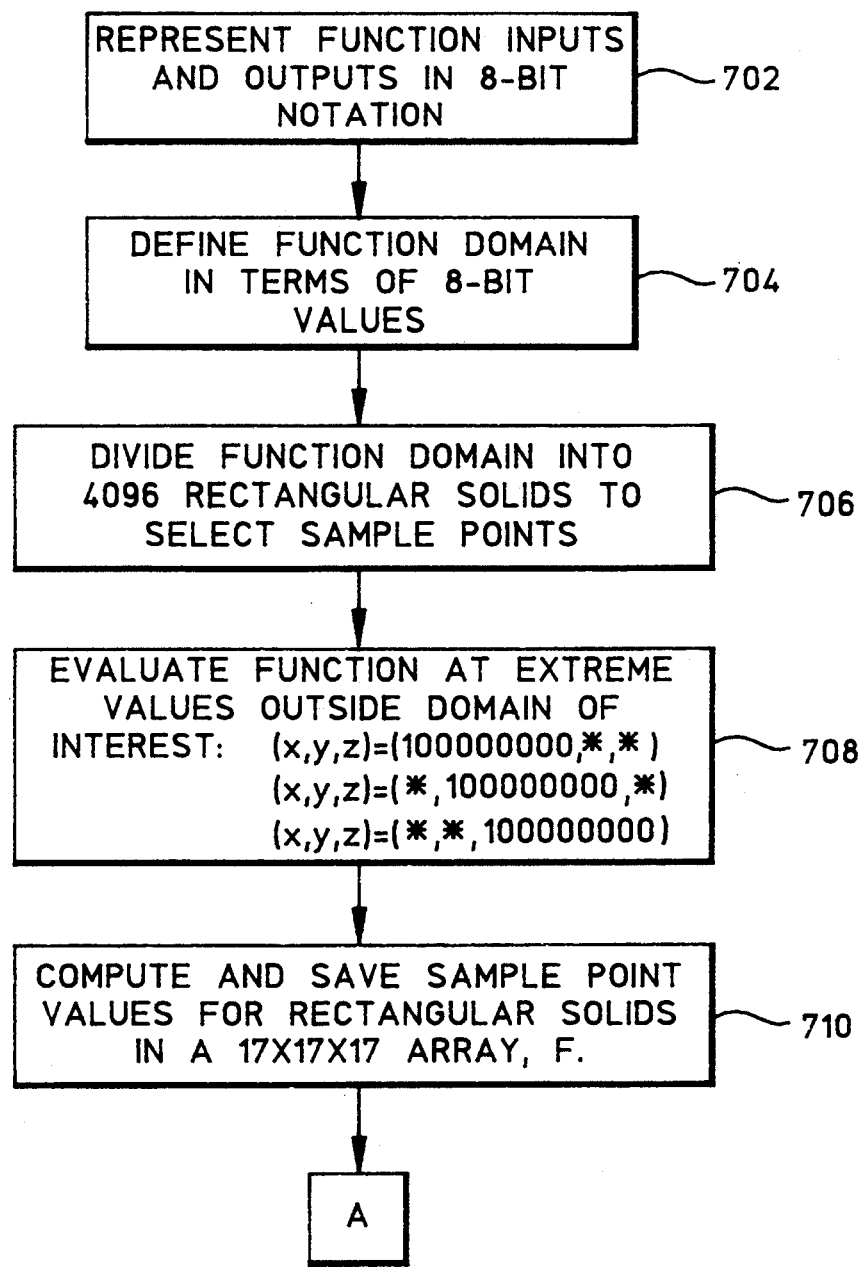
FIGS. 7A and 7B are a flowchart setting forth a second embodiment of the volummetric linear interpolation method of the present invention.
Figure 7B:
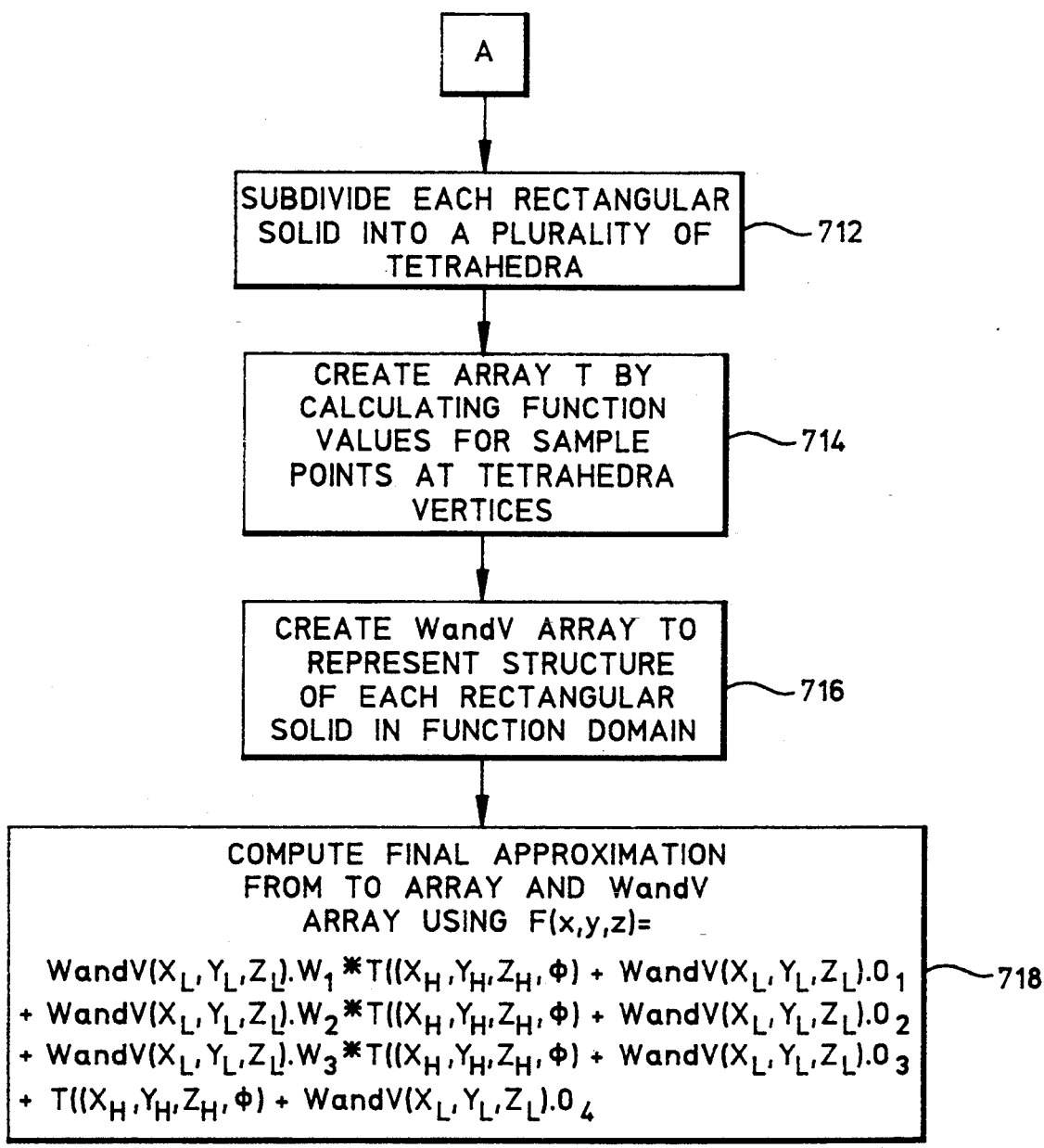

A process for practicing the second preferred embodiment of the volummetric linear interpolation procedure of the present invention is set forth in the flowchart of FIGS. 7A-7B. The procedure operates in the context of a scalar function of three variables. Each input component and output component of the function is represented by an 8-bit value (FIG. 7A, block 702). A bit addressing scheme is employed in conjunction with the 8-bit values, as will be explained below. The allowable range of input values is defined as the domain of the function (block 704). As with prior art interpolation procedures, the domain of the function is sampled for points that comprise a grid of rectangular solids. Certain of these points are then selected for the actual function approximation procedure, as will be explained more thoroughly hereinafter.

Sample points must be chosen which are situated within the domain of the function. According to the method of FIGS. 7A-7B, sample points are chosen such that there are 16 intervals for each input component, yielding a total of 17 values (FIG. 7A, block 706). This subdivides the function domain into 4096 (16×16×16) rectangular solids, where the sample values are at the corners of the solids.

At block 708, the function is evaluated at three extreme values situated outside of the function domain. This evaluation is based upon the assumption that the function is continuous even outside the domain of interest, and that the function may be evaluated at the points with a bit representation of (x, y, z)=(100000000,*,*), (x,y,z)=(*,100000000,*), and (x,y,z)=(*,*,100000000) (block 708). By definition, these points are outside the domain of interest, but they are required in order to compute approximate values for certain points situated within the domain.

Next, at block 710, the function values at the sample points comprising the corners of the rectangular solids are computed and saved in a three-dimensional array, F, having 4913 entries (17×17×17). The array F is stored in a standard memory device, such as random access memory. The entries of the array are accessed from memory by means of an advantageous addressing technique. So long as the function is continuous, uniform addressing values may be employed to access the sample point values from the memory device. If the assumption of a continuous function is not valid, then the intervals with all four high order bits of any component equal to 1 must be treated as special cases. However, assuming a continuous function, each address component of each sample point has zeros for the four low order bits.

The addressing scheme utilized in conjunction with the sample points operates as follows. The lower corner of the rectangular solid enclosing a point ( x, y, z ) is addressed using $F(x_h, y_h, z_h)$ where each of the indices $x_h$, $y_h$, and $z_h$ are in the range from 0 to 16, $x=16x_h+x_l$, $y=16y_h+y_l$, and $z=16z_h+z_l$, and $x_h$ is the number formed by the four high order bits of x, $x_l$ is the number formed by the four low order bits of x, and similarly for y and z.

Figure 8:
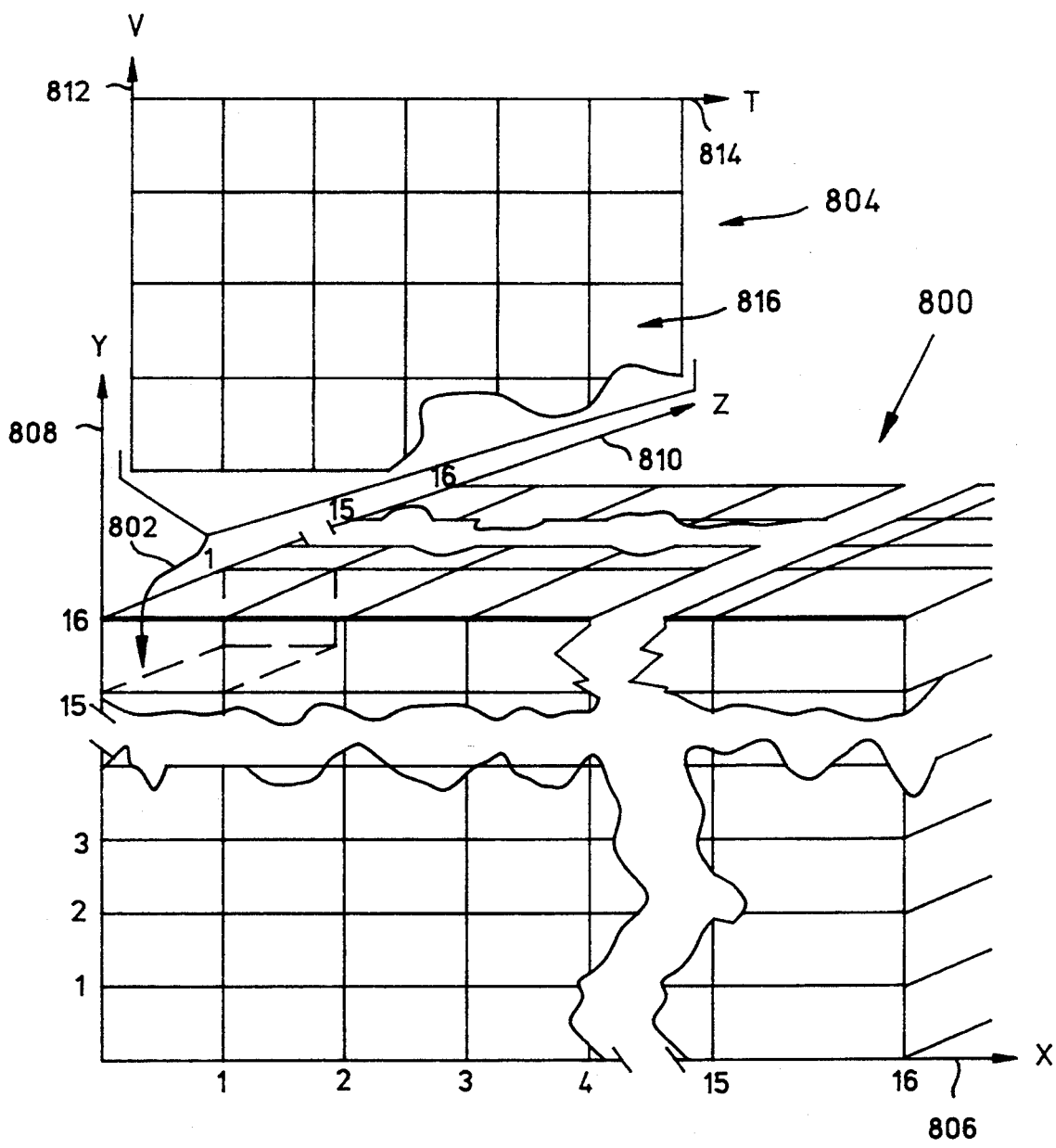
FIG. 8 is a three-dimensional memory map illustrating the data structure of the T array employed by the method of FIGS. 7A and 7B.

Each rectangular solid is further subdivided into a plurality of tetrahedra at block 712 (FIG. 7B). A T array 800 (FIG. 8) is created at block 714 by using values from array F for sample points situated on corners of the rectangular solids, and by calculating sample point values for points situated on tetrahedra vertices within the rectangular volumes. With reference to FIG. 8, the T array 800 is four-dimensional and has a maximum size of 98,304 elements (16×16×16×24) (reference 816). The T array 800 may be conceptualized as a three-dimensional array of 4096 entries (16×16×16) (reference 802), where each entry 802 is comprised of 24 array elements. The array entries 802 are accessed by indexing along an x axis 806, a y axis 808, and a z axis 810. Each array entry 802 contains a two-dimensional element table 804 having 24 elements 816 arranged in a 4×6 table. The t axis 814 has a dimension of 6 units, corresponding the six tetrahedra of each rectangular solid. The v axis 812 has a dimension of 4 units, corresponding to the 4 vertices of a tetrahedron. If, for example, an array entry 802 has x, y, and z values which represent a lower corner of a rectangular solid, an element table 804 for this array entry would contain a maximum of 24 elements 816. This multidimensional array may be stored in conventional random access memory devices by indexing the memory locations for variables x, y, z, and the element number from 1 to 24.

The 24-entry figure for each element table 804 is based upon the subdivision of each rectangular volume into six tetrahedra. The table contains an element 816 for each unique root or base point, $\vec{v}_0$, containing the function value at the base point, and an entry for each unique difference, $\vec{v}_i-\vec{v}_0$, within a tetrahedron of a rectangular solid. The values in the element table 804 may be duplicated in entries 802 representing other rectangular solids if some of the tetrahedra share roots and faces across adjacent rectangular solids. These shared values lead to a reduction in required memory space.

The memory space required for the T array may be reduced significantly over that described in the above paragraph by utilizing a special technique for subdividing the rectangular volumes into tetrahedra. Each rectangular volume is subdivided into six tetrahedra such that all six tetrahedra have a common base point at a corner of the rectangular solid, and each tetrahedron shares a common edge along a diagonal of the solid. In this manner, the array T will contain 32,767 entries (16×16×16×8), with 8 entries for each of the 4096 rectangular solids. One of these 8 entries represents the function value at the base point common to all six tetrahedra. The remaining seven of the eight entries represent the difference between the function value at one of the seven other vertices of the rectangular solid and the function value at the base point. In this manner, the required random access memory space is reduced from 98,304 entries to 32,767 entries. However, it is not possible to economize further on memory space by sharing entries for tetrahedra positioned across adjacent rectangular solids by using the common base point arrangement of tetrahedra described above, when the base points are different for different rectangular solids.

Figure 9:
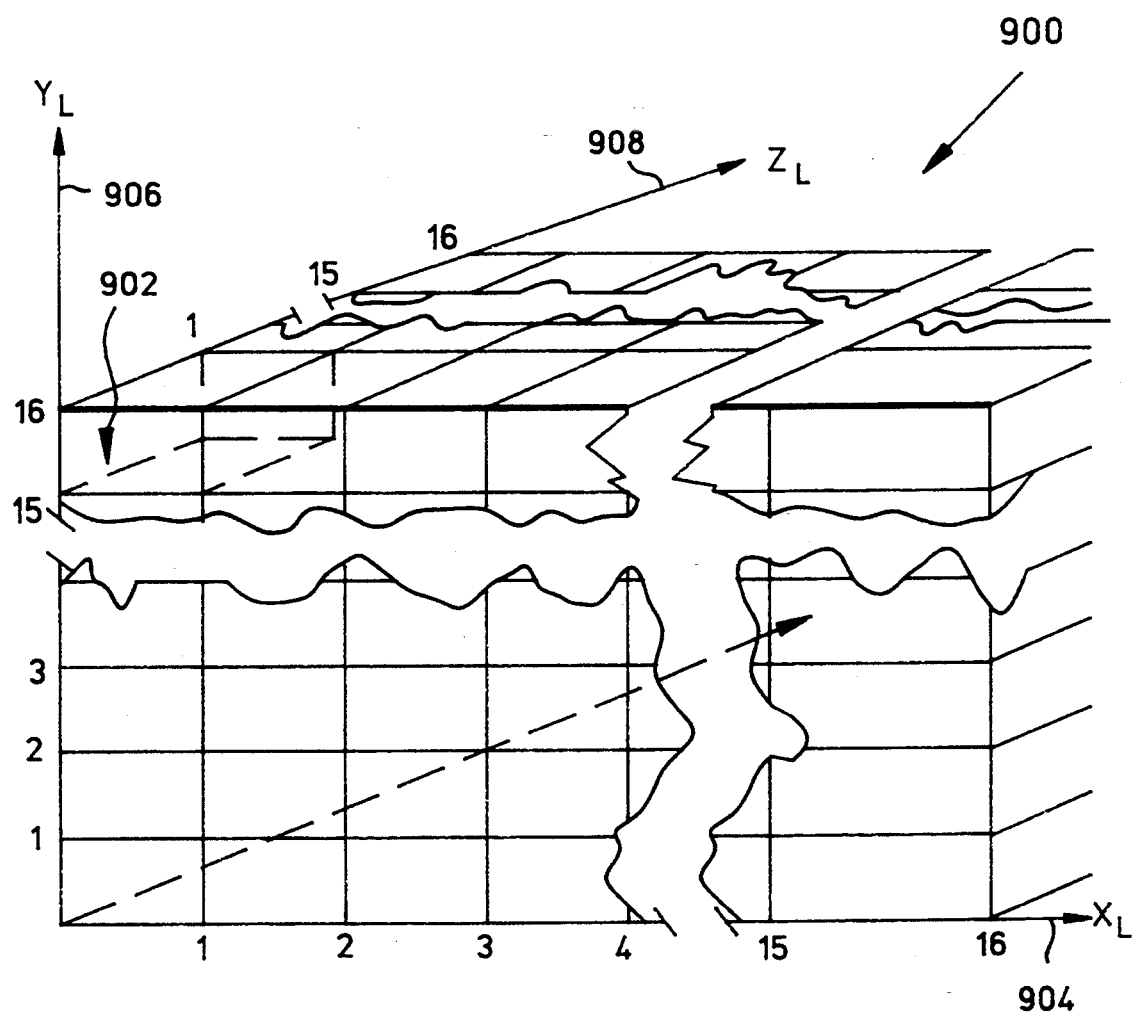
FIG. 9 is a three-dimensional memory map showing the data structure of the WandV array employed by the method of FIGS. 7A and 7B.

Returning now to FIG. 7B, one additional array, the Weights and Vertices (WandV) array, is created for the purpose of storing in a memory the underlying structure for each of the 4096 rectangular solids in the domain of the function (block 716). The data structure of the WandV array 900 is shown in FIG. 9. The WandV array 900 is a table of 4096 entries (reference 902) logically arranged in a 16×16×16 three-dimensional configuration. The WandV array 900 is addressed using WandV ($x_1$, $y_1$, $z_1$), where each of the indices $x_1$, $y_1$, and $z_1$ of WandV is in the range of 1 to 16 (or 0 to 15). The entries 902 may be stored in conventional random access memory by indexing the variables $x_1$, $y_1$, and $z_1$. A particular set of values for $x_1$, $y_1$, and $z_1$ within the permissible range (0 to 15, or 1 to 16) uniquely specifies a given entry 902 within the WandV array 900. With reference to FIG. 9, the index $x_1$ selects a group of entries 902 at a given position along the x axis 904, the index $y_1$ selects a group of entries 902 at a given position along the y axis 906, and the index $z_1$ selects a group of entries locations at a given position along the z axis 908. Each such entry 902 corresponds to one or more logical memory locations within a random access memory device.

Each entry 902 in the WandV array 900 stores information for the sample point having an offset $x_1$, $y_1$, $z_1$ within a rectangular solid. The type of information stored will be described more thoroughly in the paragraph below. The offset $x_1$, $y_1$, $z_1$ is determined with reference to a corner of the rectangular solid. The purpose of the WandV array 900 is to store information for sample points of predetermined offsets so that the array need only be computed once, and may subsequently be used often as required to implement many approximations.

The following information is stored in each entry of the WandV array 900 described in FIG. 9. Each entry contains seven items:

(1) The increment $0_1$, which is added to the value ($x_h$, $y_h$, $z_h$, 0) to obtain the index within T of the first difference value ($\vec{v}_1 - \vec{v}_0$) for the tetrahedron. This value represents a 4-tuple.

(2) The increment $0_1$, which is added to the value ($x_h$, $y_h$, $z_h$, 0) to obtain the index within T of the second difference value ($\vec{v}_2 - \vec{v}_0$) for the tetrahedron. This value represents a 4-tuple.

(3) The increment $0_3$, which is added to the value ($x_h$, $y_h$, $z_h$, 0) to obtain the index within T of the third difference value ($\vec{v}_3 - \vec{v}_0$) for the tetrahedron. This value represents a 4-tuple.

(4) The increment $0_4$, which is added to the value ($x_h$, $y_h$, $z_h$, 0) to obtain the index within T of the base point value ($\vec{v}_0$) for the tetrahedron. This value represents a 4-tuple.

(5) The weight $W_1$ which is multiplied by the first difference, $T((x_h, y_h, z_h, 0) + 0_1)$ to obtain a portion of the final approximation. This value is equal to the volume of the tetrahedron formed using the target offset and the three sample points remaining after excluding the point by $0_1$, divided by the volume of the extracted tetrahedron.

(6) The weight $W_2$ which is multiplied by the first difference, $T((x_h, y_h, x_h, 0) + 0_2)$ to obtain a portion of the final approximation. This value is equal to the volume of the tetrahedron formed using the target offset and the three sample points remaining after excluding the point by $0_2$, divided by the volume of the extracted tetrahedron.

(7) The weight $W_3$ which is multiplied by the first difference, $T((x_h, y_h, z_h, 0) + 0_3)$ to obtain a portion of the final approximation (this value is equal to the volume of the tetrahedron formed using the target offset and the three sample points remaining after excluding the point by $0_3$, divided by the volume of the extracted tetrahedron).

The final approximation is computed from the WandV array 900 (FIG. 9) and the function values array T 800 (FIG. 8) as follows (FIG. 7B, block 718).

$$
\begin{aligned}
F(x,y,z) = \;& \text{WandV}(x_1,y_1,z_1) \cdot W_1 * T((x_h,y_h,z_h,0)) + \\
& \text{WandV}(x_1,y_1,z_1) \cdot 0_1) + \\
& \text{WandV}(x_1,y_1,z_1) \cdot W_2 * T((x_h,y_h,z_h,0)) + \\
& \text{WandV}(x_1,y_1,z_1) \cdot 0_2) + \\
& \text{WandV}(x_1,y_1,z_1) \cdot W_3 * T((x_h,y_h,z_h,0)) + \\
& \text{WandV}(x_1,y_1,z_1) \cdot 0_3) + \\
& T((x_h,y_h,z_h,0)) + \text{WandV}(x_1,y_1,z_1) \cdot 0_4).
\end{aligned}
$$

The above formula is used to approximate the value v of the function at any arbitrarily selected point p 515 (FIG. 5) within the function domain. The procedure of FIGS. 7A and 7B operates by determining the rectangular solid containing the selected point, and also by ascertaining the specific tetrahedron within the solid which contains the selected point. The sample values for the function at the appropriate tetrahedron vertices are obtained from the WandV array 900 and the T array 800, and used to compute an approximation for the function value v at an arbitrarily selected point p.

In the above formula for $F(x,y,z)$, the choice of which vector to use as $\vec{v}_0$ is arbitrary. Any one of the $\vec{v}_i$ vectors could be used as $\vec{v}_0$, so long as the formula is modified accordingly. For example, in a centered-cubed tetrahedral structure, a natural choice for $\vec{v}_0$ is the center point, although a point other than the center point could be selected for $\vec{v}_0$. In methods as described above where the tetrahedra share a common diagonal of the rectangular solid, a logical choice for the base vector is the base point of the solid, or one corner of the main shared diagonal. In methods using a cube lattice of sample points, the base vector could be determined by the corner of the cube used to address into the cube.

As compared with the best existing prior art techniques, the method of the present invention computes an approximation using the same number of arithmetic operations. However, for many practical situations, the amount of storage can be substantially reduced.

Figure 10:
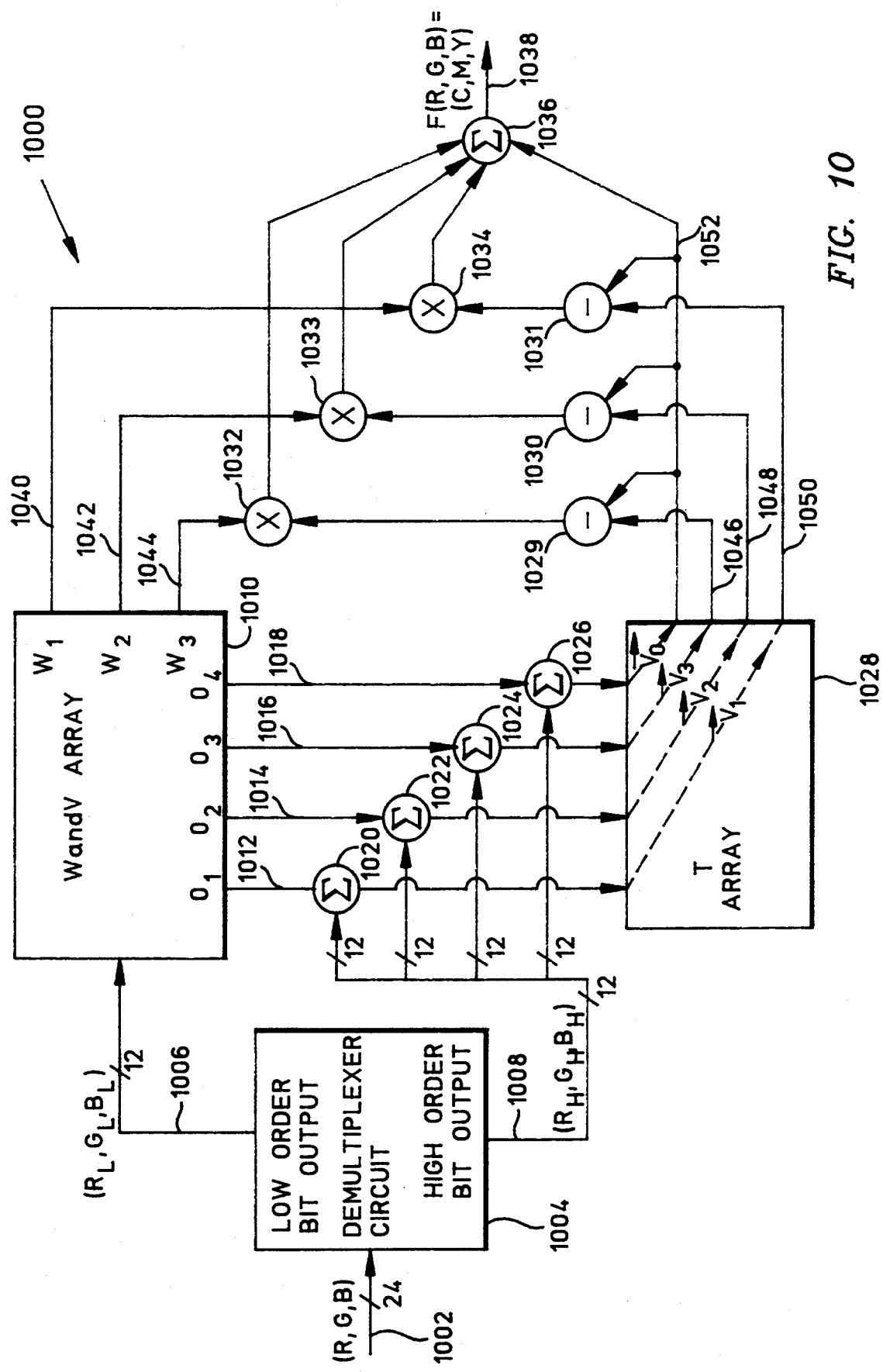
FIG. 10 is a block diagram of an arithmetic apparatus for approximating a function value according to a first embodiment of the present invention.

FIG. 10 is a block diagram of an arithmetic apparatus 1000 for approximating a function value according to a first embodiment of the invention. The apparatus 1000 accepts an input at input port 1002 in the form of an 8-bit value for each of the R, G and B components. The three 8-bit value represent the coordinates of an arbitrarily-selected point within the three-dimensional color space domain of red, green and blue. This point is the domain input to a mathematical function which produces an output in the three-dimensional color space range of cyan, magenta and yellow.

The input received at input port 1002 is fed to a demultiplexer circuit 1004 which separates the twenty-four bits into three groups of four low-order bits denoted as $R_L$, $G_L$, and $B_L$ and three groups of four high-order bits denoted as $R_H$, $G_H$, and $B_H$. The bits $R_L$, $G_L$, $B_K$, $R_H$, $G_H$ and $B_H$ correspond to bits $x_L$, $y_L$, $z_L$, $x_H$, $y_H$, and $z_H$, respectively, discussed in conjunction with FIGS. 7A and 7B.

The low-order bits traverse line 1006 and are used to index WandV array memory 1010. For each input value of $R_L$, $G_L$, and $B_L$, the WandV array memory 1010 outputs four additive constants $0_1$, $0_2$, $0_3$, and $0_4$, and three multiplicative constants $W_1$, $W_2$, and $W_3$. Additive constant $0_1$ is fed to a first input of a summer 1020 over line 1012. The second input of the summer 1020 receives the four high-order bits from each of $R_H$, $G_H$, $B_H$ from the demultiplexer circuit 1004 over line 1008. In a similar manner, additive constant $0_2$ is fed to summer 1022 over line 1014, $0_3$ is fed to summer 1024 over line 1016, and $0_4$ is fed to summer 1026 over line 1018. Each summer 1022, 1024, and 1026 adds the respective additive constant $0_2$, $0_3$ or $0_4$ to the four high-order bits from each of $R_H$, $G_H$, and $B_H$. All 12 high-order bits are conveyed to one input of each summer 1020, 1022, 1024 and 1026.

The contents of the WandV array memory 1010 are generated using the procedures described in conjunction with FIGS. 7A and 7B. The data structure of the WandV array is shown in FIG. 9. In the present example, the $X_L$ axis 904 of FIG. 9 represents the color red, and is indexed by respective values of $R_L$ at the output of demultiplexer 1004. In a similar manner, the $Y_L$ axis 906 represents green, and the $Z_L$ axis represents blue.

The outputs from summers 1020, 1022, 1024 and 1026 are used to provide an index input for a T array memory 1028. The first summer 1020 output indexes a first function value, $\vec{v}_1$, from the T array memory 1028, the second summer 1022 output indexes a second function value, $\vec{v}_2$, and the third summer 1024 output indexes a third function value, $\vec{v}_3$. The fourth summer 1026 output indexes a function value, $\vec{v}_0$ for the mathematical function at the base point of the rectangular volume specified by the high-order bits $R_H$, $G_H$ and $B_H$ of the (R, G, B) input at port 1002.

The contents of the T array memory 1028 comprise the known function values $v_I$ at the vertices of the volummetric regions which divide the range space of the function F. These values are combined with the multiplicative constants generated by the WandV array 1010 according to the formula illustrated in block 606 of FIG. 6. Thus, the first, second, and third function values, $\vec{v}_1$, $\vec{v}_2$, $\vec{v}_3$ in the term $(\vec{v}_1-\vec{v}_0)$, are each fed together with the fourth function value $\vec{v}_0$, to respective subtractors 1029, 1030 and 1031. These subtractors calculate the differences which must be individually multiplied by the respective multiplicative constants as provided in the equation of step 606. The difference value calculated by the subtractor 1031 $(\vec{v}_1-\vec{v}_0)$ is fed to the multiplier 1034 which multiplies the difference times the first multiplicative constant $W_1$. Similarly, the differences generated by the subtractors 1030 and 1029 are multiplied by weighting constants $W_2$ and $W_3$, respectively, in multipliers 1033 and 1032.

The outputs of the first, second and third multipliers 1034, 1033, and 1032, respectively, are input to a summer 1036, together with the function value $\vec{v}_0$ received from the T array memory 1028 over line 1052. The output of summer 1036 represents the output of the arithmetic apparatus 1000. This output is in the form of a function range value representing specific quantities of the colors cyan, magenta and yellow in CMY color space. The function range value is approximated by the arithmetic apparatus 1000 by applying the volummetric linear interpolation process illustrated in FIG. 6 to one or more domain inputs in red-green-blue color space.

Figure 11:
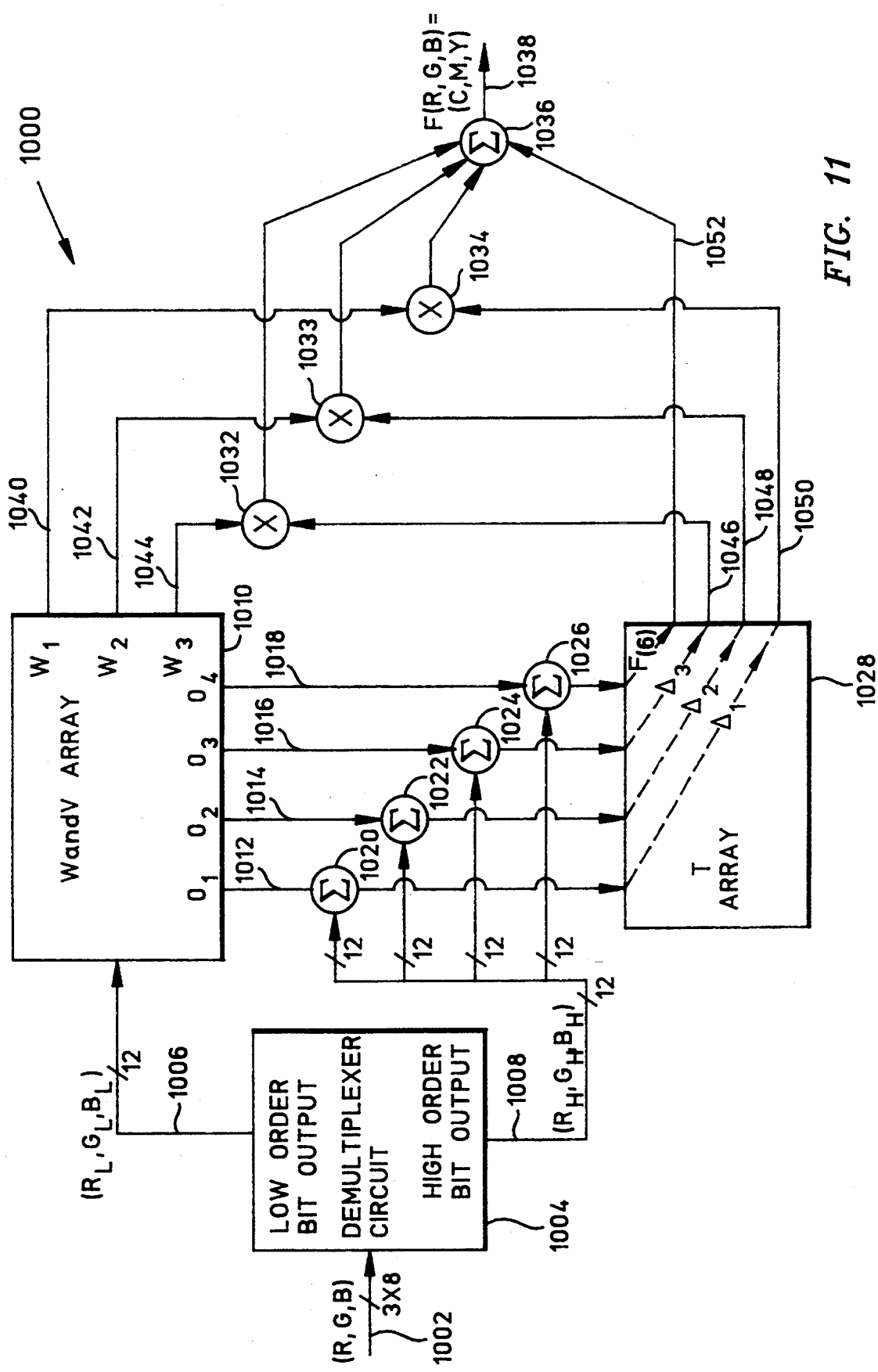
FIG. 11 is a block diagram of an arithmetic apparatus for approximating a function value according to a second embodiment of the present invention.

FIG. 11 illustrates the second embodiment of the invention which approximates the function range value by applying the volummetric linear interpolation process illustrated in FIGS. 7A, 7B, 8 and 9. The apparatus is essentially equivalent to that illustrated in FIG. 10 and discussed above with the following exceptions: the subtractors 1029, 1030 and 1031 have been eliminated; the contents of the T array memory 1028 now include the differences which were calculated by the eliminated subtractors.

The contents of the T array memory 1028 in FIG. 11 are generated in accordance with the procedure set for the in FIGS. 7A and 7B. The data structure of the T array memory 1028 is shown in FIG. 8. Applied to the present example, the X axis 806 of FIG. 8 represents red, the Y axis 808 represents green, and the Z axis 810 represents blue. The difference values $\Delta_1$, $\Delta_2$, $\Delta_3$, and the value for $\vec{v}_0$ are all stored within a four-element vertical column of one array entry 802. The vertical column denotes the array elements 816 within an entry 802 which correspond to a given value of T along the T axis 816. In turn, a given value of T corresponds to a given tetrahedral volume within a rectangular volume as specified by the values for R, G, and B at input port 1002.

Now, the outputs from the summers 1020, 1022, 1024 and 1026 index, respectively, the first function value, $\Delta_1$, a second function value, $\Delta_2$, a third difference value, $\Delta_3$, and a fourth value $\vec{v}_0$ for the mathematical function at the base point of the rectangular volume specified by the high order bits $R_H$, $G_H$ and $B_H$. The three difference values are fed directly to the multipliers 1024, 1033 and 1032, respectively, while the function value $\vec{v}_0$, is fed, together with products produced by the multipliers, to the summer 1036. Now, the output of the summer 1036 represents approximation of the function range value according to the linear interpolation process illustrated in FIGS. 7A, 7B, 8 and 9.

An advantage of the interpolation techniques described in FIGS. 7A, 7B, 8, 9, and 10 is that the overall memory space required to store in interpolation tables has been reduced over that utilized by prior art techniques. Although the invention employs two table, a T array and a WandV array, the total amount of memory space consumed by these tables is considerably less than that required for various prior-art systems. In prior art systems utilizing a single interpolation constants table, the size of the required table is much larger than the combined size of the two tables of the present invention.

A number of specific embodiments of the invention have been described. Nevertheless, it will be understood that various modifications and changes may be made without departing from the spirit and scope of the invention. For example, a function domain may be divided and/or subdivided unequally. The unequal division can be implemented using automatic meshing techniques known to those skilled in the art. These meshing techniques are used to prepare data for analysis using the Finite Element Method of mathematical analysis, which is well known in the art. The method of the present invention may be applied to color image processing, and it may also be advantageously applied to other fields where it is desired to compute the value of a multivariable function. Accordingly, it is to be understood that the invention is not to be limited by the specific illustrated embodiments, but only by the scope of the appended claims.

We claim:

1. An arithmetic apparatus for approximating a value $\bar{v}$ of a function F having a domain input in a first n-dimensional color space and a range output in a second m-dimensional color space, the domain input being divided into a plurality of n-dimensional volumes, having k+1 vertices k≧n, each of the vertices comprising sample domain input points $\bar{p}$, each of the sample domain input points $\bar{p}$ having a set of coordinates in the first color space, the apparatus comprising:

(a) input port means responsible to a plurality of bits representing a set of coordinates for an arbitrarily selected domain input point $\bar{p}$ situated within the first color space, the point $\bar{p}$ having coordinates $x_1$, $x_2$, ..., $x_n$, such that $x_1$ represents a first color component in the first color space, $x_2$ represents a second color component in the first color space, and so on such that $x_n$ represents the $n^{th}$ color component in the first color space, the plurality of bits including a plurality of high order bits and a plurality of low order bits;

(b) demultiplexer means coupled to the input port means for separating the plurality of bits into high order bits and low order bits, the low order bits being conveyed to a first output terminal of the demultiplexer means and the high order bits being conveyed to a second output terminal of the demultiplexer means;

(c) weights and vertices array means coupled to the first output terminal of the demultiplexer means for producing an output consisting of k+1 additive constants, and k multiplicative constants, in response to the low order bits from the demultiplexer means;

(d) first summer means coupled to the weights and vertices array means and the second output terminal of the demultiplexer means for calculating k+1 index values, each index value of the k+1 index values being calculated as an arithmetic sum of the high order bits and a different one of the additive constants;

(e) volummetric array means coupled to the first summer means for producing an output consisting of k function values, and a base point function value, in response to the receipt of the k+1 index values;

(f) first subtractor means coupled to the volummetric array means for calculating k difference values, each difference value of the k difference values being calculated as the mathematical difference of a respective function value and the base point function value;

(g) multiplier means coupled to the weights and vertices array means and to the first subtractor means for calculating k products, each product of the k products being calculated as the mathematical product of a respective difference value and a respective multiplicative constant; and (h) second summer means coupled to the volummetric array means and the multiplier means to provide an output signal comprising m components wherein said output signal is representative of an arithmetic sum of the k products and the base point function value.

2. An arithmetic apparatus as set forth in claim 1 wherein the domain input is divided into a plurality of rectangular volumes, each rectangular volume including $2^n$ corners, the corners including one base point corner which is the base point function value, and $2^n - 1$ side corners.

3. An arithmetic apparatus as set forth in claim 1 wherein the domain input is divided into a plurality of rectangular volumes, each of the rectangular volumes being further divided into a plurality of minimal simplicial volumes and each of the rectangular volumes has $2^n$ corners including one base point corner and $2^n - 1$ side corners, and the simplicial volumes are arranged within the rectangular volumes such that one vertex of each of the simplicial volumes is formed by the base point corner which is the base point function value of each of the simplicial volumes.

4. An arithmetic apparatus as set forth in claim 1 wherein the domain input is divided into a plurality of rectangular volumes, each of the rectangular volumes being further subdivided into a plurality of simplicial volumes arranged within the rectangular volumes such that one vertex of each simplicial volume is formed by one point, the base point function value for each simplicial volume, interior to the rectangular volume.

5. An arithmetic apparatus as set forth in claim 4 wherein the plurality of bits include n 8 bit values representing a set of coordinates for an arbitrarily selected domain input point $\bar{p}$ situated within the first color space, each 8 bit value having 4 low order bits and 4 high order bits, or 3 low order bits and 5 high order bits or 5 low order bits and 3 high order bits.

6. An arithmetic apparatus as set forth in claim 5 wherein the first color space is divided into a plurality of n-dimensional rectangular volumes and the weights and vertices array means include a weights and vertices information set associated with a selected domain point having an offset within one of the rectangular volumes as specified by the low order bits, the weights and vertices information set including the k+1 additive constants, and k multiplicative constants.

7. An arithmetic apparatus as set forth in claim 1 wherein the first color space is a three-dimensional color space.

8. An arithmetic apparatus as set forth in claim 7 wherein the first color space is a three-dimensional color space of red, green and blue or cyan, magenta and yellow.

9. An arithmetic apparatus as set forth in claim 7 wherein the first color space is a colormetric color space based on tristimulus values.

10. An arithmetic apparatus as set forth in claim 1 wherein the second color space is a three-dimensional color space.

11. An arithmetic apparatus as set forth in claim 10 wherein the second color space is a three-dimensional color space of red, green and blue or cyan, magenta and yellow.

12. An arithmetic apparatus as set forth in claim 10 wherein the second color space is a colormetric color space based on tristimulus values.

13. An arithmetic apparatus as set forth in claim 1 wherein the first color space is a four-dimensional color space.

14. An arithmetic apparatus as set forth in claim 13 wherein the first color space is a four-dimensional color space of cyan, magenta, yellow and black.

15. An arithmetic apparatus as set forth in claim 1 wherein the second color space is a four-dimensional color space.

16. An arithmetic apparatus as set forth in claim 15 wherein the second color space is a four-dimensional color space of cyan, magenta, yellow and black.

17. An arithmetic apparatus for approximating a value $\bar{v}$ of a function F having a domain input in a first n-dimensional color space and a range output in a second m-dimensional color space, the domain input being divided into a plurality of n-dimensional volumes, having $k+1$ vertices $k \geq n$, each of the vertices comprising sample domain input points $\bar{p}$, each of the sample domain input points $\bar{p}$ having a set of coordinates in the first color space, the apparatus comprising:

(a) input port means responsible to a plurality of bits representing a set of coordinates for an arbitrarily selected domain input point $\bar{p}$ situated within the first color space, the point $\bar{p}$ having coordinates $x_1$, $x_2, \ldots, x_n$, such that $x_1$ represents a first color component in the first color space, $x_2$ represents a second color component in the first color space, and so on such that $x_n$ represents the $n^{th}$ color component in the first color space, the plurality of bits including a plurality of high order bits and a plurality of low order bits;

(b) demultiplexer means coupled to the input port means for separating the plurality of bits into high order bits and low order bits, the low order bits being conveyed to a first output terminal of the demultiplexer means and the high order bits being conveyed to a second output terminal of the demultiplexer means;

(c) weights and vertices array means coupled to the first output terminal of the demultiplexer means for producing an output consisting of $k+1$ additive constants, and k multiplicative constants, in response to the low order bits from the demultiplexer means;

(d) first summer means coupled to the weights and vertices array means and the second output terminal of the demultiplexer means for calculating $k+1$ index values, each index value of the $k+1$ index values being calculated as an arithmetic sum of the high order bits and a different one of the additive constants;

(e) volummetric array means coupled to the first summer means for producing k function values, and an output of k difference values and a base point function value, in response to the receipt of the $k+1$ index values, each difference value being calculated as a mathematic difference of a respective function value and the base point function value;

(f) multiplier means coupled to the weights and vertices array means and to the volummetric array means for calculating k products, each product of the k products being calculated as the mathematical product of a respective difference value and a respective multiplicative constant; and (g) second summer means coupled to the volummetric array means and the multiplier means to provide an output signal comprising m components wherein said output signal is representative of an arithmetic sum of the k products and the base point function value.

18. An arithmetic apparatus as set forth in claim 17 wherein the domain input is divided into a plurality of rectangular volumes, each rectangular volume including $2^n$ corners the corners including one base point corner which is the base point function value, and $2^n-1$ side corners.

19. An arithmetic apparatus as set forth in claim 17 wherein the domain input is divided into a plurality of rectangular volumes, each of the rectangular volumes being further divided into a plurality of minimal simplicial volumes and each of the rectangular volumes has $2^n$ corners including one base point corner and $2^n-1$ side corners, and the simplicial volumes are arranged within the rectangular volumes such that one vertex of each of the simplicial volumes is formed by the base point corner which is the base point function value of each of the simplicial volumes.

20. An arithmetic apparatus as set forth in claim 17 wherein the domain input is divided into a plurality of rectangular volumes, each of the rectangular volumes being further subdivided into a plurality of simplicial volumes arranged within the rectangular volumes such that one vertex of each simplicial volume is formed by one point, the base point function value for each simplicial volume, interior to the rectangular volume.

21. An arithmetic apparatus as set forth in claim 20 wherein the plurality of bits include n 8 bit values representing a set of coordinates for an arbitrarily selected domain input point $\bar{p}$ situated within the first color space, each 8 bit value having 4 low order bits and 4 high order bits, or 3 low order bits and 5 high order bits or 5 low order bits and 3 high order bits.

22. An arithmetic apparatus as set forth in claim 21 wherein the first color space is divided into a plurality of n-dimensional rectangular volumes and the weights and vertices array means include a weights and vertices information set associated with a selected domain point having an offset within one of the rectangular volumes as specified by the low order bits, the weights and vertices information set including the $k+1$ additive constants, and k multiplicative constants.

23. An arithmetic apparatus as set forth in claim 17 wherein the first color space is a three-dimensional color space.

24. An arithmetic apparatus as set forth in claim 23 wherein the first color space is a three-dimensional color space of red, green and blue or cyan, magenta and yellow.

25. An arithmetic apparatus as set forth in claim 23 wherein the first color space is a colormetric color space based on tristimulus values.

26. An arithmetic apparatus as set forth in claim 17 wherein the second color space is a three-dimensional color space.

27. An arithmetic apparatus as set forth in claim 26 wherein the second color space is a three-dimensional color space of red, green and blue or cyan, magenta and yellow.

28. An arithmetic apparatus as set forth in claim 26 wherein the second color space is a colormetric color space based on tristimulus values.

29. An arithmetic apparatus as set forth in claim 17 wherein the first color space is a four-dimensional color space.

30. An arithmetic apparatus as set forth in claim 29 wherein the first color space is a four-dimensional color space of cyan, magenta, yellow and black.

31. An arithmetic apparatus as set forth in claim 17 wherein the second color space is a four-dimensional color space.

32. An arithmetic apparatus as set forth in claim 31 wherein the second color space is a four-dimensional color space of cyan, magenta, yellow and black.

* * * * *

UNITED STATES PATENT AND TRADEMARK OFFICE
CERTIFICATE OF CORRECTION

PATENT NO. : 5,432,892
DATED : July 11, 1995
INVENTOR(S) : Hafner et al.

It is certified that error appears in the above-indentified patent and that said Letters Patent is hereby corrected as shown below:

Column 15, line 6, please change "K$\overset{a}{=}$n" to --K$\overset{a}{=}$n--;

Column 15, line 68, please change each occurence of "comers" to --corners--;

Column 16, lines 1 and 12, please change "comer" to --corner--;

Column 16, line 2, please change "comers" to --corners--;

Column 16, line 65, please change "eyan" to --cyan--;

Column 17, line 3, please change "eyan" to --cyan--;

Column 17, line 68, please change each occurence of "comers" to --corners--;

Column 17, line 9, please change "K$\overset{a}{=}$n" to --K$\overset{a}{=}$n--;

Column 18, lines 1, 8, and 12, please change "comer" to --corner--; and

Column 18, line 67, please change "eyan" to --cyan--.

Signed and Sealed this

Thirty-first Day of October 1995

*Attest:*

BRUCE LEHMAN

*Attesting Officer*   Commissioner of Patents and Trademarks